B. J. WILLIAMS.

Window Screens and Shutters.

No. 5,527. Reissued August 5, 1873.

Witnesses.

J. Mason Goozler

N. A. Daniels

Inventor:

Benj J. Williams

By Attorney G. B. Fowler

AM. PHOTO-LITHOGRAPHIC CO. N.Y. (OSBORNE'S PROCESS.)

UNITED STATES PATENT OFFICE

BENJAMIN J. WILLIAMS, OF PHILADELPHIA, PENNSYLVANIA.

IMPROVEMENT IN WINDOW SCREENS AND SHUTTERS.

Specification forming part of Letters Patent No. 102,900, dated May 10, 1870; reissue No. 5,527, dated August 5, 1873; application filed July 8, 1873.

DIVISION A.

*To all whom it may concern:*

Be it known that I, BENJ. J. WILLIAMS, of Philadelphia, in the county of Philadelphia and State of Pennsylvania, have invented a certain new and useful Improvement in Venetian Blinds and Inside Folding Shutters; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
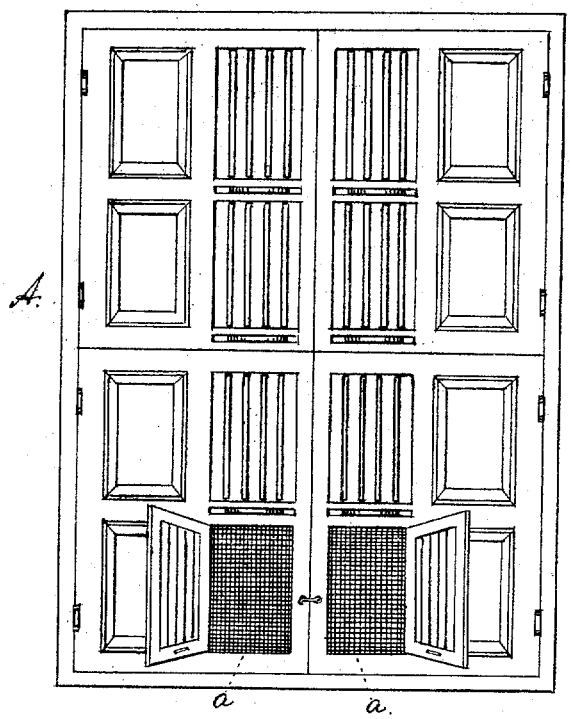
Figure 2:
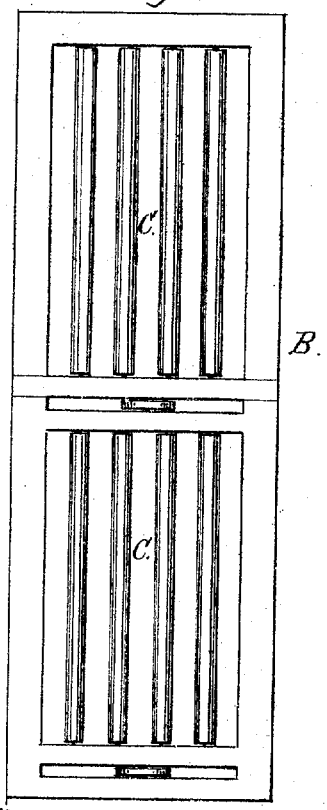
Figure 3:
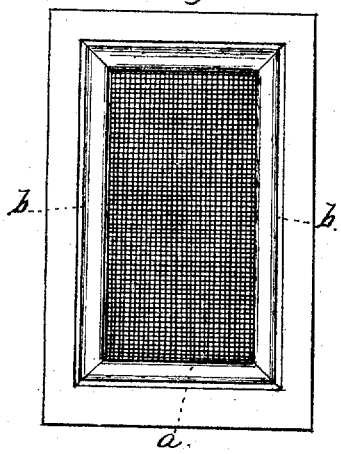
Figure 4:
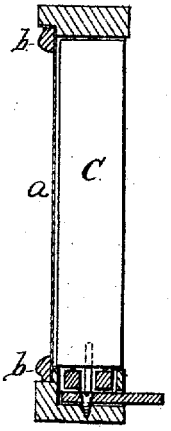
Figure 5:
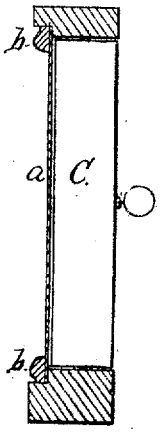

Figure 1 is a front or inside view. Fig. 2 is a view of a section of the blind detached. Fig. 3 is a view, showing wire-screen attached to blind, and beads or moldings for securing the same. Figs. 4 and 5 are sectional views.

Like letters in all figures of the drawings indicate like parts.

The object of this invention is to provide a Venetian blind and inside folding shutter with wire screens for excluding insects; and it consists of rabbets formed in the edges of the stiles and rails of the blind to receive the said screens, in combination with beads or moldings, which, while serving the purpose to fasten the screens in the said rabbets and form a finish around the same, also serve to exclude the glimmering light from the crevices around the ends and sides of the outer slats, by the said beads being made wider than the rabbets, so as to overlap the slats all around when closed, thus enabling the room to be effectually darkened, when desired, which cannot be done with the blinds now in use.

A is a Venetian blind and inside folding shutter, having the blind B provided with wire screens *a*. C are the slats. The outside edges of the stiles and rails of the blind are rabbeted deep enough all around to receive the screens *a* and beads *b*. The screens are set in the rabbets, and the beads mitered and made to fit snugly over the screens and against the edges of the stiles and rails, (see Fig. 3,) and then nailed with the usual sprig-nails to fasten the screens. The beads being made wider than the rabbets, (see Figs. 4 and 5,) it will be seen that they will overlap or close up the openings around the ends and sides of the outer slats when closed, and thus keep out the light or rays of the sun, so that the room can be effectually darkened.

From the foregoing description it will be seen that the screens can be applied to all doors where the upper panels are left out and movable slats used; also, to windows of every description having blinds with movable slats.

It will be understood that the blinds are to be constructed and provided with the screens according to the room or place designed to use them—as, for instance, in the windows of a bed-room they may be constructed so as to make the room private, and yet afford air and light, and exclude insects at the same time; or, if desired, the panel-shutters can be dispensed with, and a full blind and screen used; or, where full panel-shutters are used in a hall and staircase window, the upper panels of the lower section may be left out, and slats with screens substituted in place of them, and so on.

If desirable, for the purpose of giving a clear and unobstructed view of the street to a person at the window, the blinds of the lower section may be hinged to the panel-shutters on either side, so that they may be swung open, (see Fig. 1,) the person in that case having the benefit of a window-screen with sash hoisted.

Having thus fully described my invention, what I claim therein as new, and desire to secure by Letters Patent, is—

In an inside blind or door having movable slats, wire screens attached in rabbets made in the stiles and rails of the blind, in combination with beads or moldings made wider than the rabbets, substantially as and for the purposes set forth.

In testimony that I claim the foregoing I have hereunto set my hand.

BENJ. J. WILLIAMS.

Witnesses:

B. J. WILLIAMS, Jr.,

JOHN THARP.